(No Model.)

S. HARRIS.
MOTOR SUSPENSION FOR ELECTRIC STREET CARS.

No. 532,057. Patented Jan. 8, 1895.

Witnesses
Myron B. Vorce
Roland Rider

Inventor
Samuel Harris
by C. M. Vorce
Att'y

UNITED STATES PATENT OFFICE.

SAMUEL HARRIS, OF CLEVELAND, OHIO.

MOTOR SUSPENSION FOR ELECTRIC STREET-CARS.

SPECIFICATION forming part of Letters Patent No. 532,057, dated January 8, 1895.

Application filed May 19, 1894. Serial No. 511,764. (No model.)

*To all whom it may concern:*

Be it known that I, SAMUEL HARRIS, a citizen of the United States, residing at Cleveland, in the county of Cuyahoga and State of Ohio, have invented certain new and useful Improvements in Motor Suspensions for Electric Street-Cars; and I do hereby declare the following to be a full, clear, and exact description of the invention, such as will enable others skilled in the art to which it appertains to make and use the same.

My invention relates to improvements in the attachment of electric motors to street car trucks. Its object is to reduce the jar and noise incident to the operation of electric street cars and to lessen the wear on the motor and car truck; and it consists in the novel features of construction, combination, and arrangement hereinafter fully described.

Figure 1:
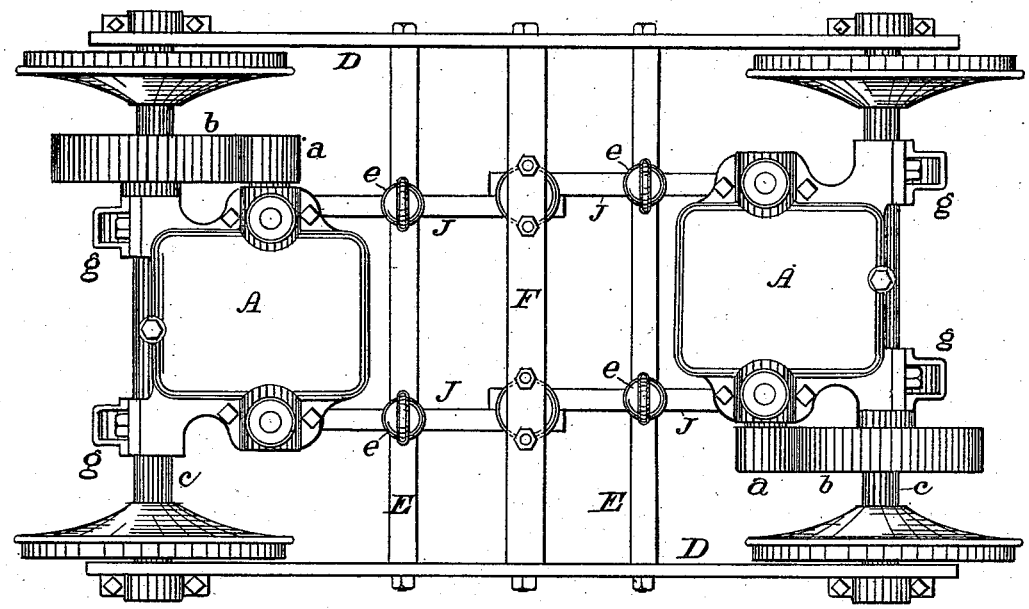
Figure 2:
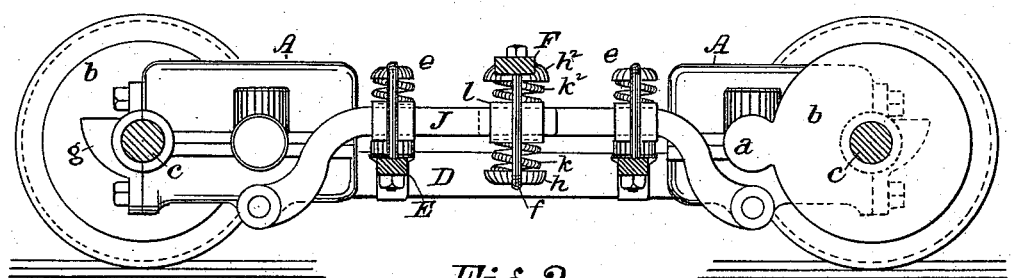
Figure 3:
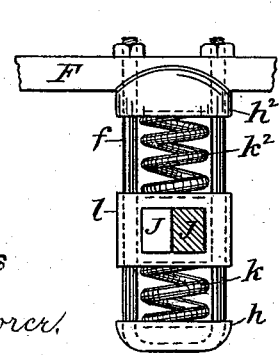
Figure 4:
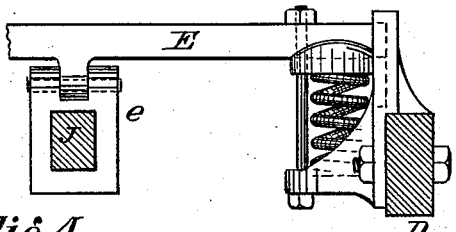

In the drawings Figure 1 represents, in plan view, an ordinary electric street car truck having its motors arranged and attached in a manner embodying my invention. Fig. 2 is a side view in elevation of the apparatus shown in Fig. 1. Fig. 3, is a detached view of the spring suspension joint by which the two motor frames are connected, as hereinafter described; and Fig. 4 shows a modified form of spring-bearing and its attachment to the truck.

A A represent the motors each inclosed in a case or shell, and having a gear $a$ meshing with a larger gear $b$ on the car axle $c$ in the usual way. D D are the side bars of the truck, and E, E, F, are cross bars connecting the two side bars intermediate of the car wheels. The motors are connected to the car axles by bearings $g$ $g$ on the motor case of frame, and are connected together by means of bars J J, which are pivoted near their middle on a spring bearing supported on the truck frame, and are pivoted at one end to the motor case or frame, and, at or about the center of the truck, are pivotally connected by a spring suspended joint attached to the intermediate cross bar F. As the result of this construction and arrangement the two motors ride as one body, and move in unison in yielding to the sway and jolt of the car, one lifting when the other does, and vice versa.

Although I do not confine or limit myself to the precise construction and arrangement shown in the drawings, the construction there shown has been found efficient, and will be particularly described as illustrating one efficient method of utilizing my invention.

The cross bars E, F are bolted or otherwise secured to the side bars D, and carry the pivotal spring-bearing attachments of the bars J J to the truck frame. Since the vertical motion of the motors is concentric with the car axles to which they are secured, it is necessary that the pivotal point of the bar J on the cross bar E should be movable in relation to one or the other of the pivoted members, in order to accommodate the varying distance between the pivot planes caused by such motion. I prefer to do this by giving the pivotal attachment on the cross bar E a rocking movement, and to this end I attach to the cross bar E, a pivotal spring-bearing $e$ for each of the bars J J, and pivotally connect the same thereto, said bearing being given a rocking movement, either by pivoting or hinging it to the bar E, as shown in Fig. 4, or by making it rigid with the bar E and giving the latter a rocking motion on the truck frame, as shown in Fig. 2.

The inner ends of the bars J J are connected pivotally in such manner that a similar compensation for the varying distance between the pivot planes may be effected, and the pivotal connection is spring-suspended in the following manner.

A stirrup $f$ is secured to the cross bar F and carries a cupped plate $h$ on which rests a spring $k$, supporting a casing $l$ through which the ends of the bars J J pass, and to which they may if preferred be pivoted. Above the casing $l$ is another spring $k^2$, and over this another cupped plate $h^2$ fitting the under side of the cross bar F. The casing $l$ is cupped above and below to receive the ends of the springs, and this as well as the plates $h$ $h^2$ have grooves in each side to fit upon the stirrup, so that as the weight of the motors is brought upon the casing $l$ it rides vertically in the stirrup between the springs $k$ $k^2$, to prevent displacement thereof. Either coil springs or any other suitable spring, such for instance as a rubber spring may be used.

The bars J J may, if preferred, be pivoted together at the point where they pass between the springs $k$ $k^2$, a little play on the pivot being allowed, but it is equally efficient and in some respects preferable to pass the bars J J through the bearings $e\ e$ and $l\ l$ so that they have a slight sliding movement therein, which has all the effect of an actual pivoting of the bars to their bearing with less liability of breakage. The rocking pivots act, of course, as movable fulcrums to the bars J J, which have thus the effect of levers, and being either actually or in effect pivoted together at the point where they pass between the springs $k$ $k^2$, it follows that when one motor moves in either direction vertically as the result of any shock or jar on the wheels or truck, the other motor is moved in the same direction simultaneously, and thus the rebound of the motors on their sustaining springs is checked, the movement of either motor is limited, the wear is reduced, the motors ride easier and steadier, and without the jar and rattle caused by the motion of the motors as ordinarily experienced.

Other modifications of the construction will readily occur to a skilled mechanic whereby the same result may be attained.

The essential feature of my invention is the connection of the two motors by a pivotal spring-supported connection, so as to counteract the effect of the jar on the wheels and truck and cause the two motors to move correspondingly and in unison in yielding to the jar or shock.

There is always a natural tendency of one motor to draw downward on its support and of the other to lift, which action has a tendency to increase the wear on the motor. By my improvement I do away entirely with this tendency and establish a complete equilibrium between the motors, thus prolonging their life.

What I claim as my invention, and desire to secure by Letters Patent, is—

1. An electric street-railway car truck having the motors supported at one side on the axles and connected on the other side by spring-supported levers, pivoted to the motor case and fulcrumed on the truck whereby the motors are made to move in unison, and the effects of jar are distributed between the motors, substantially as described.

2. In an electric street-railway car truck the combination with the axles, the motors attached to and intergeared therewith, and the framework of the truck, of a lever pivoted to each motor and fulcrumed on the truck, the inner ends of the levers being joined in a spring-supported bearing, whereby the movement of one motor is communicated to the other, substantially as described.

3. In an electric street-railway car truck the combination with the axles, the motors attached to and intergeared therewith, and the framework of the truck, of an intermediate spring-bearing supporting a bar connected to each motor, said bars being connected together between said spring bearings by a connection permitting a pivotal movement, substantially as described.

4. In an electric street-railway car truck the combination with the axles, the motors attached to and intergeared therewith, and the framework of the truck, the bars pivotally connected at one end to each of the motors and pivotally supported on the truck by a rocking spring-bearing with their free ends meeting in the center of the truck, springs above and beneath the meeting ends of said bars, and a support for said springs rigid with the truck frame, substantially as described.

In testimony whereof I hereto affix my signature in presence of two witnesses.

SAMUEL HARRIS.

Witnesses:
P. PRENTISS,
ROLAND RIDER.